United States Patent [19]

Sai

[11] Patent Number: 5,272,334
[45] Date of Patent: Dec. 21, 1993

[54] DEVICE FOR DETECTING A TEMPERATURE DISTRIBUTION HAVING A LASER SOURCE WITH TEMPERATURE AND WAVELENGTH ADJUSTING MEANS

[75] Inventor: Yukio Sai, Tokyo, Japan

[73] Assignee: Kabushiki Kaisha Toshiba, Kawasaki, Japan

[21] Appl. No.: 961,177

[22] Filed: Oct. 16, 1992

[30] Foreign Application Priority Data

Oct. 17, 1991 [JP] Japan .................................. 3-269408
Oct. 17, 1991 [JP] Japan .................................. 3-269415

[51] Int. Cl.$^5$ ............................................ H01J 5/16
[52] U.S. Cl. ................................ 250/227.21; 356/44; 250/227.18
[58] Field of Search ..................... 250/227.21, 227.11, 250/227.15, 227.14, 227.18, 227.23; 356/44, 45, 301, 73.1, 445; 374/131, 161

[56] References Cited

U.S. PATENT DOCUMENTS

| | | | |
|---|---|---|---|
| 4,313,344 | 2/1982 | Brogardh et al. | 356/44 |
| 4,673,299 | 6/1987 | Dakin | 374/131 |
| 4,767,219 | 8/1988 | Bibby | 356/44 |
| 4,823,166 | 4/1989 | Hartog et al. | 356/44 |
| 5,102,232 | 4/1992 | Tanabe et al. | 356/44 |

FOREIGN PATENT DOCUMENTS 3-46588 2/1991 Japan .

OTHER PUBLICATIONS

Kingsley, Stuart A., "Distributed Fiber-optic Sensors," Proc. of the 1984 ISA Show, Houston, Tex. 22/25 Oct. 1984, pp. 315-330.

Dakin, J. P., et al., "Temperature Distribution Measurement Using Raman Ratio Thermometry," SPIE, vol. 566, Fiber Optic and Laser Sensor III (1985) pp. 249-256.

Primary Examiner—David C. Nelms
Assistant Examiner—Que T. Le
Attorney, Agent, or Firm—Foley & Lardner

[57] ABSTRACT

An apparatus for measuring temperature along an optical fiber uses backscattered light and optical time domain reflectometry to obtain a measure of the temperature distribution along the fiber. The ratio of anti-Stokes Raman to Stokes Raman backscattered light is used to determine the temperature distribution. In order to compensate for fluctuations in the wavelength of a laser source there is provided in a first embodiment an optical filter which passes Fresnel components of the light reflected from a distal end of the fiber. Changes in the ratio of the filtered Fresnel components correspond to changes in the source wavelength which may then be compensated by adjusting the source wavelength. In a second embodiment, the optical filter is used to measure the ratio of anti-Stokes Raman and Stokes Raman backscattered components derived from a reference temperature section of the fiber in which the temperature is held constant. Variations in this ratio result from source fluctuations which may again be compensated so as to maintain the laser source at a substantially constant output frequency thus permitting more accurate measurement of the temperature distributed along the fiber.

26 Claims, 7 Drawing Sheets

DEVICE FOR DETECTING A TEMPERATURE DISTRIBUTION HAVING A LASER SOURCE WITH TEMPERATURE AND WAVELENGTH ADJUSTING MEANS

BACKGROUND OF THE INVENTION

1. Field of the Invention

This invention relates to a device for detecting a temperature distribution using backscattered light. More particularly, light backscattered from an optical fiber may be used to determine the temperature distribution along the fiber. Temperature measurements may be thus made along the entire length of the fiber without the disadvantages inherent in electrical sensors such as electrical interference and electrical sparking. The invention is suitable for use in any application where it is desired to know the temperature along any point on the optical fiber.

2. Description of the Background Art

The background of the invention may be understood by reference to the following publications and patents which are incorporated herein by reference:

(1) Kingsley, Stuart A., "Distributed Fiber-optic Sensors," PROC. OF THE 1984 ISA SHOW, Houston, Tex. 22/25 Oct. 1984, pp. 315-330;

(2) Dakin, J. P., et al., "Temperature Distribution Measurement Using Raman Ratio Thermometry," SPIE, Vol. 566, Fiber Optic and Laser Sensor III (1985) pp. 249-256;

(3) Hartog et al., U.S. Pat. 4,823,166; and (4) Dakin, U.S. Pat. 4,673,299.

Optical fibers using backscattered light for temperature distribution measurements employ pulsed laser beams as the input light into the fiber. The light backscattered at each point along the fiber contains temperature data in the form of the spectra, intensity and polarization of the backscattered light. Optical Time Domain Reflectometry (OTDR) is utilized to measure and process the backscattered light. The backscattered light propagated back through the fiber is detected and processed as time series signals, and a unidimensional temperature distribution along the optical fiber is measured. The time of receipt of the backscattered light is proportional to the distance along the fiber at which the scattering occurred, which is related to the temperature at the point of scattering.

In general, three types of scattered light are produced: Rayleigh scattered light due to density fluctuations, Brillouin scattered light due to interactions with acoustic waves of similar wavelength as that of the propagating light, and Raman scattered light due to the vibration and rotation of molecules interacting with the propagating light.

While Rayleigh scattering is elastic, Brillouin and Raman scattering are inelastic, and produce spectrums which are different from the spectrum of the incident light.

While temperature data is included in all of the three types of scattered light, Raman scattered light is most sensitive to temperature.

Raman scattering involves the transfer of energy between the vibrational modes of the glass material in the fiber and the incident photons of the laser source. The Raman scattering may result in the creation of a photon (Stokes Raman scattering) or in the transfer of energy from a vibrational mode to an existing photon (anti-Stokes Raman scattering). Stokes Raman scattered light has a wavelength shifted to a longer wavelength as compared with the wavelength of the incident light and anti-Stokes Raman scattered light has a wavelength shifted to a shorter wavelength as compared with the wavelength of the incident light. The Stokes Raman and anti-Stokes Raman backscattered light are selected by a filter, and the temperature distribution is calculated using a value based on the ratio of the two backscattered and filtered beams. (See Ref. 2). However, it is possible to use only the anti-Stokes backscattered beam instead of the ratio, e.g., see Ref. 3.

The filter may be fabricated from a dielectric multilayer or a metallic layer. The scattered light is shifted several scores of a nano-meter, and the amount of shift is a function of the material composition of the fiber.

A problem in the prior systems is the failure to stabilize the wavelength of the laser light used as the incident pulse light with the filter cut-off frequency. When the relationship between the filter cut-off wavelength and the laser oscillation wavelength changes, inaccuracies occur in the temperature measurements along the fiber resulting in, for example, a shift of a zero point or a slope error.

To produce a commercially useful temperature distribution detecting device, it is desirable to ensure that the wavelength of the laser radiation incident on the fiber is kept constant and within the cut-off frequencies of the filter so as to ensure accurate temperature measurements.

However, in conventional temperature distribution detecting devices as described above, since the ratio of the intensity of the anti-Stokes Raman scattered light to the intensity of the Stokes Raman scattered light is a function essentially of temperature, it can not be determined whether a change in the detected signals is due to temperature variations or a change in the oscillation wavelength of the laser.

SUMMARY OF THE INVENTION

It is an object of the invention to provide a more accurate temperature detecting device by overcoming the disadvantages of the prior art.

More particularly, it is an object of the invention to provide a temperature distribution detecting device which can control the relation between the oscillation wavelength of the laser and the cut-off wavelengths of the filter and measure the temperature distribution without errors due to changes in the oscillation wavelength of the laser.

The invention may be characterized as a device for compensating for fluctuations in the wavelength of a laser source of light. The invention is used in an apparatus for measuring the temperature distribution along an optical fiber using backscattered light. The device for wavelength compensation uses an optical filter, a processing circuit, and a device for adjusting the wavelength of the laser source. The optical filter receives the light backscattered from the fiber as a result of directing pulsed laser light into one end of the fiber. The optical filter has a characteristic such as to pass therethrough Fresnel components of the backscattered light. The processing circuit is connected to receive signals representative of said Fresnel components and generates an electrical control signal in response to changes in said received signals representative of said Fresnel components. These control signals are then fed to the wavelength adjusting device so as to permit adjustment of the wavelength of the source to compensate for wavelength drifts of the source which would otherwise cause inaccuracies in the temperature measurements.

DETAILED DESCRIPTION OF THE PREFERRED EMBODIMENTS

The following is a description of a first embodiment of the invention with reference to the FIGS. 1-5.

Figure 1:
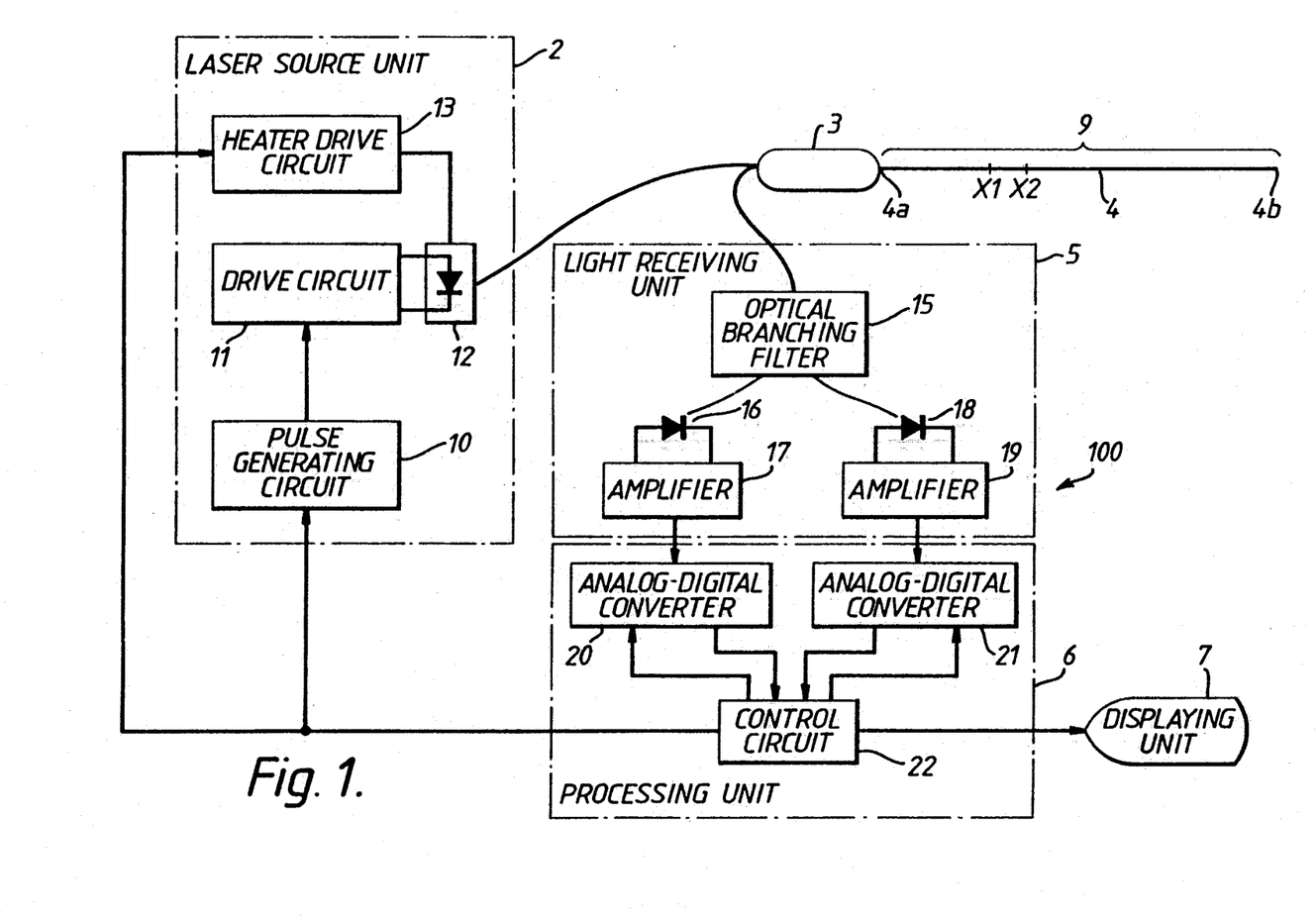
FIG. 1 is a schematic diagram showing a first embodiment of the invention.

As illustrated in FIG. 1, a temperature distribution detecting device 100 has a laser source unit 2, a directional coupler 3, an optical fiber 4, a light receiving unit 5, a processing unit 6 and a displaying unit 7. The optical fiber 4 has a proximal end as an input/output (I/O) end 4a for the incident/received pulsed laser light and a distal end 4b. Between the two ends 4a and 4b is disposed a measurement part 9 of the optical fiber 4.

Pulsed laser beams are output by the laser source unit 2, and the output pulsed laser beams are fed into the optical fiber 4 through the directional coupler 3. Backscattered light is separated from the forward propagating light by the directional coupler 3 and is fed to the light receiving unit 5. In the light receiving unit 5, the received backscattered light is separated into two channels respectively corresponding to the anti-stokes Raman scattered light and the Stokes Raman scattered light. Each light channel produces an electrical signal proportional to the amplitude of the received light. The electric signals are processed by the processing unit 6, and the electric signals are displayed on a screen (not shown) of the displaying unit 7.

The Fresnel reflection signal which is generated when the pulsed laser beams reach the end edge 4b of the optical fiber 4 is likewise fed to the light receiving unit 5 through the directional coupler 3. In accordance with the first embodiment, the processing unit 6 is used to control the temperature of a laser source 12 included in the laser source unit 2 so as to keep the wavelength of the laser source 12 constant based upon measurements of the Fresnel reflected light.

The laser source unit 2 has a pulse generating circuit 10, a drive circuit 11, the laser source 12 and a heater drive circuit 13. The pulse generating circuit 10 generates a drive pulse signal when a trigger signal is output from the processing unit 6. The drive circuit 11 produces a drive signal when it receives the drive pulse signal from the pulse generating circuit 10. The laser source 12 outputs the pulsed laser beam when the drive signal is output from the drive circuit 11. The heater drive circuit 13 controls the temperature of the laser source 12 and regulates the wavelength of the pulsed laser beam output from the laser source 12 when a temperature control signal is output from the processing unit 6. When the heater drive circuit 13 controls the temperature of the laser source 12 in response to the temperature control signal output from the processing unit 6 and the drive circuit 11 is provided with the drive pulse signal from the pulse generating circuit 10, the heater drive circuit 13 controls the laser source 12 to output the pulsed laser beam having the wavelength set by the temperature control signal and provides the pulsed laser beam to the directional coupler 3.

The directional coupler 3 passes the pulsed laser beam from the laser source 12 to the I/O end 4a of the optical fiber 4. Further, the directional coupler 3 separates out the backscattered light, including the Fresnel reflected light, which are output from the I/O end 4a and provides them to the light receiving unit 5.

In this case, when the pulsed laser beam is fed to the I/O end 4a of the optical fiber 4, the Stokes Raman scattered light and the anti-Stokes Raman scattered light are reflected from each part of the optical fiber 4 as the backscattered light. This backscattered light, together with the reflected Fresnel light from the distal end 4b pass to the I/O end 4a of the fiber 4 and are fed by the directional coupler 3 to the light receiving unit 5.

The light receiving unit 5 has an optical branching filter 15, detectors 16, 18 and amplifiers 17, 19. The filter 15 divides the light provided from the directional coupler 3 into components of the Stokes Raman scattered light and the anti-Stokes Raman scattered light. The detector 16 has an avalanche photodiode and converts the components of the Stokes Raman scattered light which is provided from the optical branching filter 15 into an electric signal. The amplifier 17 amplifies the electric signal output from the detector 16. Similarly, the detector 18 has an avalanche photodiode and converts the components of the anti-Stokes Raman scattered light which is provided from the optical branching filter 15 into an electric signal. The amplifier 19 amplifies the electric signal from the detector 18.

The processing unit 6 receives the electrical signals from the light receiving unit 5 and includes analog-to-digital converters 20, 21 and a control circuit 22. The control circuit 22 includes, for example, a microprocessor having a CPU, ROM, RAM and conventional timing circuits. The microprocessor is programmed to carry out the averaging and ratio calculations as more particularly described below.

The analog-to-digital converter 20 converts a signal corresponding to the Stokes Raman scattered light provided from the amplifier 17 of the light receiving unit 5 into a digital signal. The analog-to-digital converter typically operates at a high speed, for example, converting each data point within one ns (nano-second). Likewise, the analog-to-digital converter 22 converts a signal corresponding to the anti-Stokes Raman scattered light provided from the amplifier 19 of the light receiving unit 5 into a digital signal. The control circuit 22 periodically generates a trigger signal at a predetermined cycle, and provides the trigger signal to the laser source unit 2. The circuit 22 averages the received digital signals from the analog-to-digital converters to determine an average ratio of components of the Fresnel reflected light from one end of the fiber, and uses this ratio to maintain wavelength (or frequency) control of the laser source 12 via the heater drive circuit 13. Moreover, the control circuit 22 uses ratio values of anti-Stokes Raman to Stokes Raman backscattering along the entire length of the fiber 4 (the measurement part 9) to provide temperature data representing the temperature distribution along the fiber, and provides this temperature data to displaying unit 7.

The displaying unit 7 may include a cathode-ray tube (CRT) or other suitable display device. The displaying unit 7 inputs the measured result produced by the processing unit 6 and displays it on the screen (not shown).

Next, the operation of this embodiment will be described with reference to FIG. 1.

The trigger signal is generated at a predetermined cycle by the control circuit 22 of the processing unit 6 and the generated trigger signal is provided to the laser source unit 2. The drive pulse signal is generated by the pulse generating circuit 10 of the laser source unit 2, and is provided to the drive circuit 11. The pulsed laser beams are output from the laser source 12 controlled by the drive circuit 11. The output pulsed laser beams are input into the I/O end 4a of the optical fiber 4 via the directional coupler 3.

Figure 2:
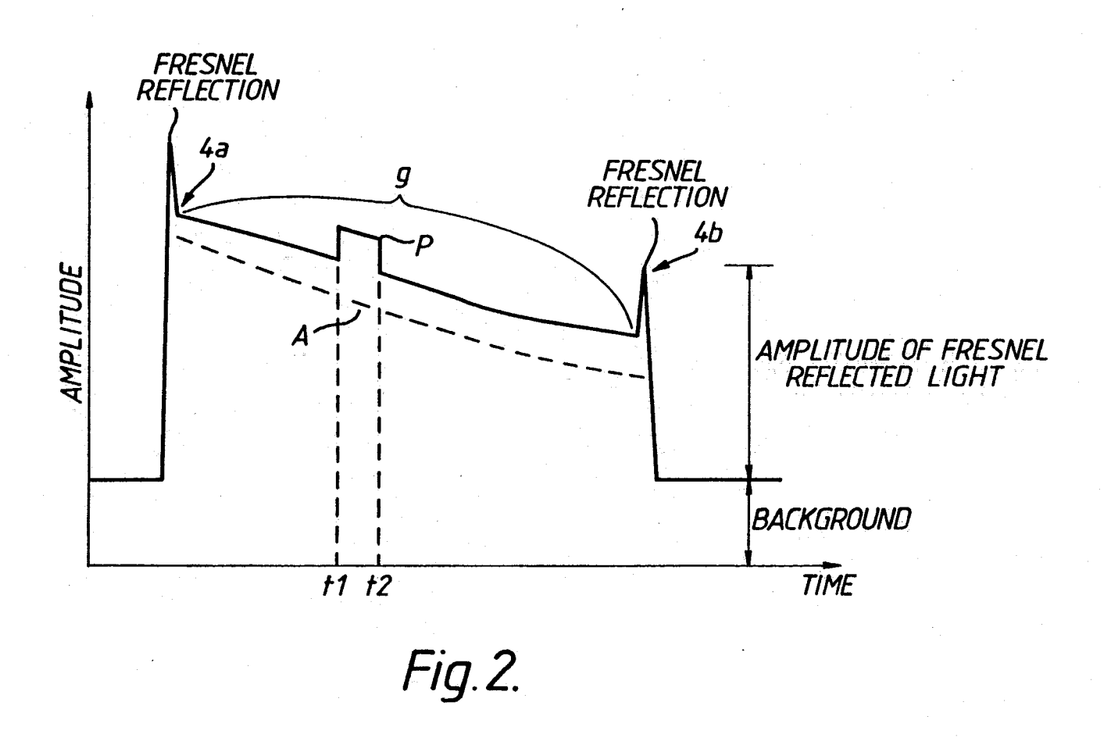
FIG. 2 is a graphical representation showing an example of an optical signal which is returned from one end of an optical fiber as shown in FIG. 1.

As illustrated in FIG. 2, when the pulsed laser beam the beam is reflected by the I/O end 4a which is detected as a relatively strong reflection. Backscattered light occurs throughout the entire distributed length of the measurement part 9 of the fiber 4. A part of this backscattered light is scattered as Stokes Raman scattered light and another part as anti-Stokes Raman scattered light. The backscattered light propagates along the fiber to the I/O end 4a. Further, Fresnel reflection causes a strong intensity pulse reflected from the distal end 4b of the optical fiber 4, and this Fresnel reflection is likewise propagated to the I/O end 4a of the fiber 4. The Stokes Raman scattered light, the anti-Stokes Raman scattered light and the Fresnel reflected light are separated out from the forwardly propagated light (the light going into the fiber from the laser source 12) by the directional coupler 3 and are provided to the light receiving unit 5.

Figure 3:
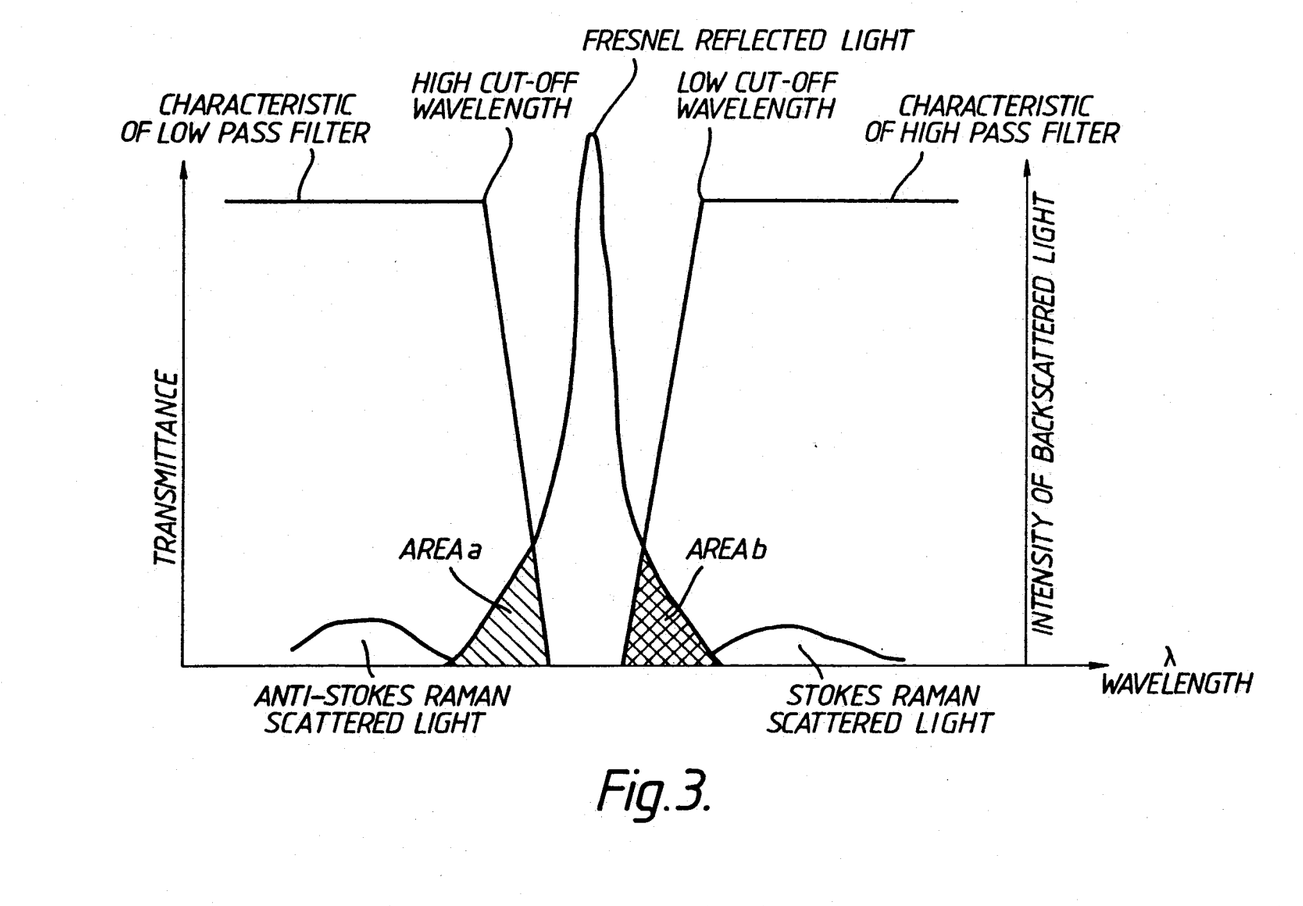
FIG. 3 is a graphical representation showing the relation between a spectrum of Fresnel reflection light which is returned from an end of the optical fiber and characteristics of a filter of an optical branching filter as shown in FIG. 1.

The optical branching filter may comprise separate low and high pass filters which have filter characteristics as shown in FIG. 3. The low pass filter passes all wavelengths shorter than its high cut-off wavelength, and the high pass filter passes all wavelengths longer than its low cut-off wavelength. As a result, the leading and trailing edges of the high intensity Fresnel reflected light from the distal end 4b of the fiber are measured. These areas are illustrated as "area a" and "area b" in FIG. 3. Likewise, the anti-Stokes Raman and Stokes Raman backscattered light are measured from all points along the measurement part 9 of the fiber 4. As an example, the center wavelength of the Fresnel reflection peak may be 900 nm with the low pass filter passing wavelengths less than 850 nm and the high pass filter passing wavelengths greater than 950 nm. In FIG. 3, the components of the anti-Stokes Raman and Stokes Raman within the areas a and b respectively are quite small and may be ignored during the monitoring and adjustment of the laser source wavelength. Of course, these anti-Stokes Raman and Stokes Raman components are of key importance in measuring the temperature distribution along the fiber. For points along the fiber, not including the fiber end points, the high intensity Fresnel reflection does not occur, and thus the only components of interest within the bandpasses of the filters are the anti-Stokes Raman and Stokes Raman scattering spectra.

The filtered spectral components are converted into the electric signals by the detectors 16, 18 and these electric signals are amplified by the amplifiers 17, 19. The amplified signals are provided to the analog-to-digital converters 20, 21 of the processing unit 6 where the analog signals are converted into the digital signals. The converted digital signals are provided to the control circuit 22.

The signals corresponding to the anti-Stokes Raman and Stokes Raman scattering are stored in the memory of the control circuit. It will be appreciated that the received backscattered signals are received as delayed timed signals in relation to the incident laser pulse beam which itself is triggered by the periodic trigger signal generated from the timing circuitry within the control circuit 22. The timing circuitry may of course simply comprise the CPU clock and appropriate software to periodically generate a trigger pulse, say every 5 or 10 seconds depending on the length of the fiber being used in the measurement. Since averaging of the signals is generally desired, the measurement may represent the average of several separate measurements with each measurement yielding a set of numbers representing the backscattered anti-Stokes Raman and Stokes Raman light from each point along the fiber. For example, sets of values received from a second measurement are added to and stored in the corresponding locations in memory as those in the same time period as received during the first measurement. The CPU software then determines an averaged value for each of the anti-Stokes Raman component and the Stokes Raman component of the received light. The ratio of the Stokes Raman to the anti-Stokes Raman backscattered light at each point along the fiber is obtained and the result displayed as an indication of the temperature distribution along the fiber. Generally, the measurement resolution is defined by the pulse width of the pulsed laser beam. (See Ref. 1).

The ratio of the intensity of the anti-Stokes Raman scattered light to the intensity of the Stokes Raman scattered light may be expressed by the following numerical expression:

$$R = (\lambda s / \lambda a)^4 \cdot exp(-h \cdot c \cdot v / K \cdot T)$$

where:
 $\lambda s$ is the wavelength of the Stokes Raman scattered light;
 $\lambda a$ is the wavelength of the anti-Stokes Raman scattered light;
 v is a wave number of the Raman shifted wave;
 T indicates the absolute temperature;
 K is Boltzman's constant;
 h is Plank's constant; and
 c is the velocity of light.

$\lambda s$, $\lambda a$ and v are constants depending on the fiber material. As described by the above numerical expression, R is a function of temperature only. (See Ref. 2). R does not depend on the intensity of the pulsed laser beams.

The temperature distribution so obtained is illustrated in FIG. 2. In this FIGURE, P indicates a portion of the fiber 4 which is hotter in relation to the remaining portions of the fiber. This hotter portion is observed as a higher intensity of backscattered light in the anti-Stokes Raman scattering spectra occurring between time periods t1 and t2 These time periods correspond to, for example, a location on the fiber at displacements x1 and x2 from the I/O end 4a. Dotted line A represents the normal attenuation occurring within the fiber for all light propagated therethrough. This attenuation amount may be subtracted out from the ratio values prior to their display if desired to yield an essentially flat background. The portion P then appears as a "square wave" pulse on top of the flat background.

As is known by those skilled in the art, the temperature distribution may be obtained from the anti-Stokes Raman backscattered light alone (e.g., see Ref. 3) and need not be obtained from the ratio of the anti-Stokes Raman backscattered light to the Stokes Raman backscattered light as indicated above. In this connection it is noted that the anti-Stokes Raman backscattered light is proportional to source intensity and the absolute temperature along the fiber whereas Stokes Raman backscattered light is proportional to the source intensity. Thus, the use of the ratio is preferable since it removes the source intensity as an added variable. However, the frequency compensation techniques as taught herein may equally well be used when measuring the temperature distribution using only the anti-Stokes Raman backscattered light. The anti-Stokes Raman backscattered light is filtered in the low pass filter channel which is passed to the CPU and memory via analog-to-digital converter 20. Accumulation of this data results in a temperature distribution (assuming approximately constant source intensity) as indicated in FIG. 2. In FIG. 2, the amplitude axis for the measurement portion 9 corresponds to temperature and the time axis corresponds to distance along the fiber.

In accordance with the principles of the invention, the Fresnel reflected light is used to monitor any wavelength drifts in the laser source and to automatically correct for same. To this end, the ratio of the area a to the area b in FIG. 3 is determined. This area may be determined by the CPU programmed to search for a peak value of the received light from the distal end of the fiber. This peak is, as indicated above, very strong, and the software need only be programmed to look for an overall peak or may use a combination of an amplitude criteria coupled with a time criteria to easily find the peak corresponding to the Fresnel reflection at the distal end of the fiber.

Once the portion of the stored data corresponding to the Fresnel reflection is determined, the ratio of area a to area b is calculated and compared to a predetermined value, e.g., one. The actual value of the ratio is not important here; only changes in the ratio are important, since such changes indicate a drift in the source wavelength.

Figure 4:
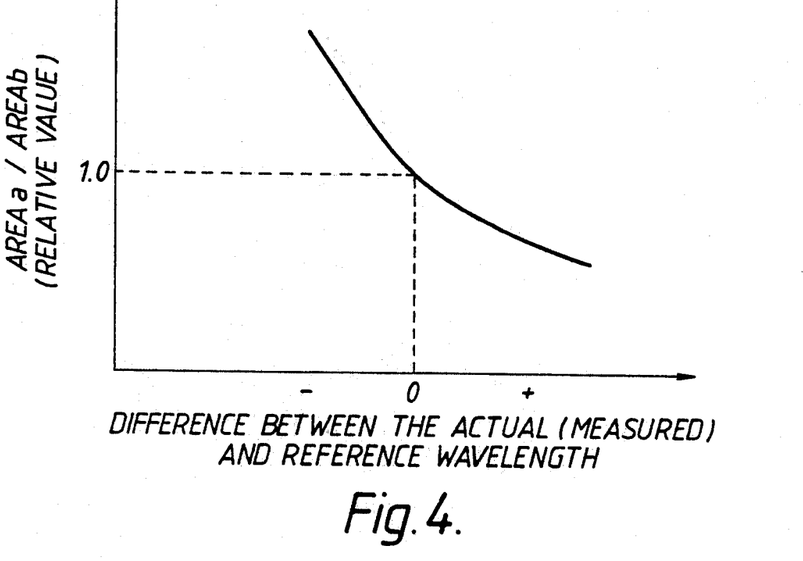
FIG. 4 is a graphical representation showing the relation between changes in the wavelength of a pulsed laser beam output from a laser source and the ratio of area a to area b corresponding to low and high wavelength portions of the Fresnel reflected light as shown in FIG. 3.

Any change in the ratio of area a to area b corresponds to a change in the output wavelength of the laser source as compared to its nominal or "reference" value as indicated in FIG. 4. A larger value for the ratio corresponds to a negative difference between the actual (measured) value of the wavelength as compared to the nominal (reference) value meaning that the control unit 22 operates to increase the wavelength of the source. A smaller value of the ratio causes the control unit 22 to decrease the value of the source wavelength. The source wavelength is controlled by controlling the heater drive circuit 13.

Figure 5:
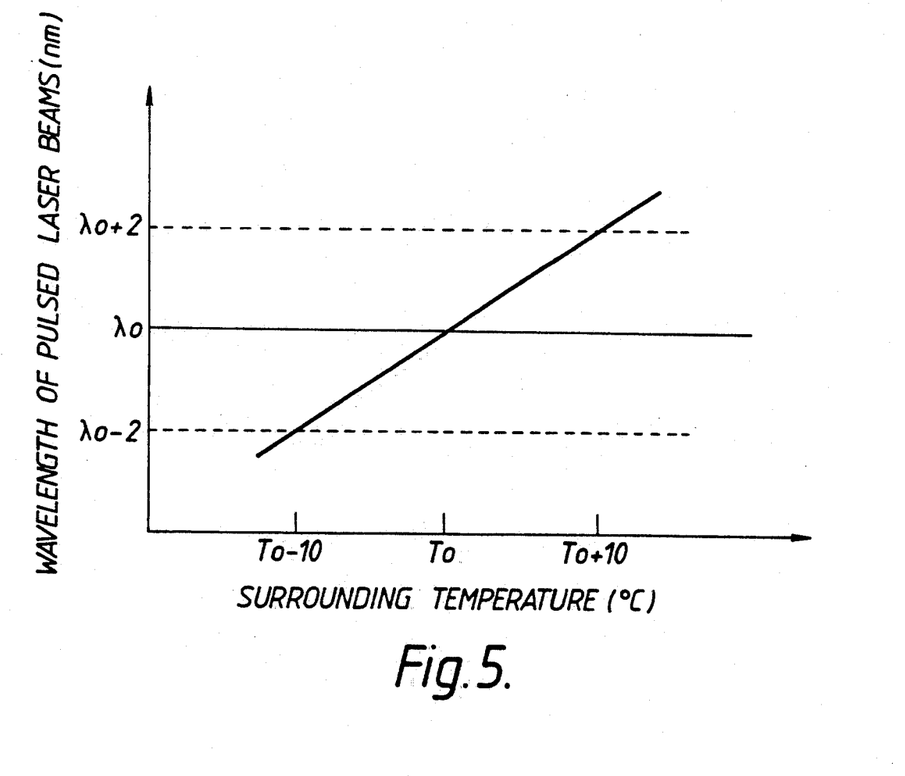
FIG. 5 is a graphical representation showing the relation between the wavelength of the pulsed laser beam output from the laser source as shown in FIG. 1 and surrounding temperature.

In this case, when a vertical multi mode-type pulse semiconductor laser which produces high-powered laser beams is used as the laser source 12, as shown in FIG. 5, if the surrounding temperature rises 10° C., the wavelength of the laser beams lengthens about 2 nm, and if the surrounding temperature falls 10° C., the wavelength of the pulsed laser beams shortens about 2 nm.

The frequency adjustment technique used to stabilize the source wavelength may be continuously employed during the temperature measurement. Each pulsed laser beam produces data corresponding not only to the temperature measurement but also to the shift, if any, in the Fresnel reflected light. Since both are monitored at the same time, the adjustment of the source wavelength may take place with each cycle of temperature data accumulation.

In accordance with the first embodiment of the invention, it is possible to control the relation between the wavelength of the pulsed laser beams from the laser source 12 with respect to the cut-off wavelengths of the optical branching filter 15. Using this source wavelength monitoring and adjusting technique, it is possible to measure the temperature distribution along the fiber (using conventional techniques) without the error due to the change of the wavelength of the laser beams output by the laser source 12.

Figure 7:
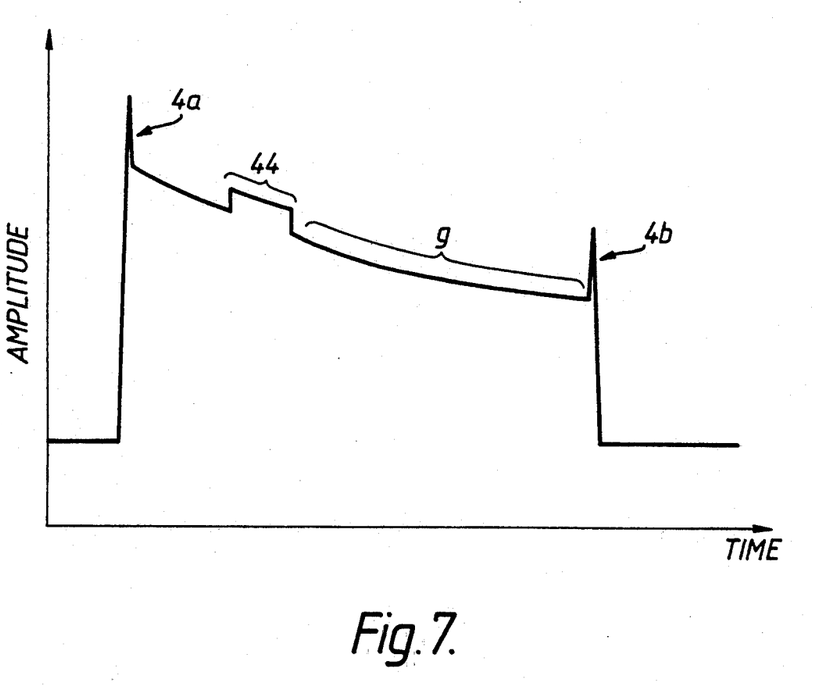
FIG. 7 is a graphical representation showing an example of an optical signal which is returned from one end of an optical fiber as shown in FIG. 6.
Figure 8:
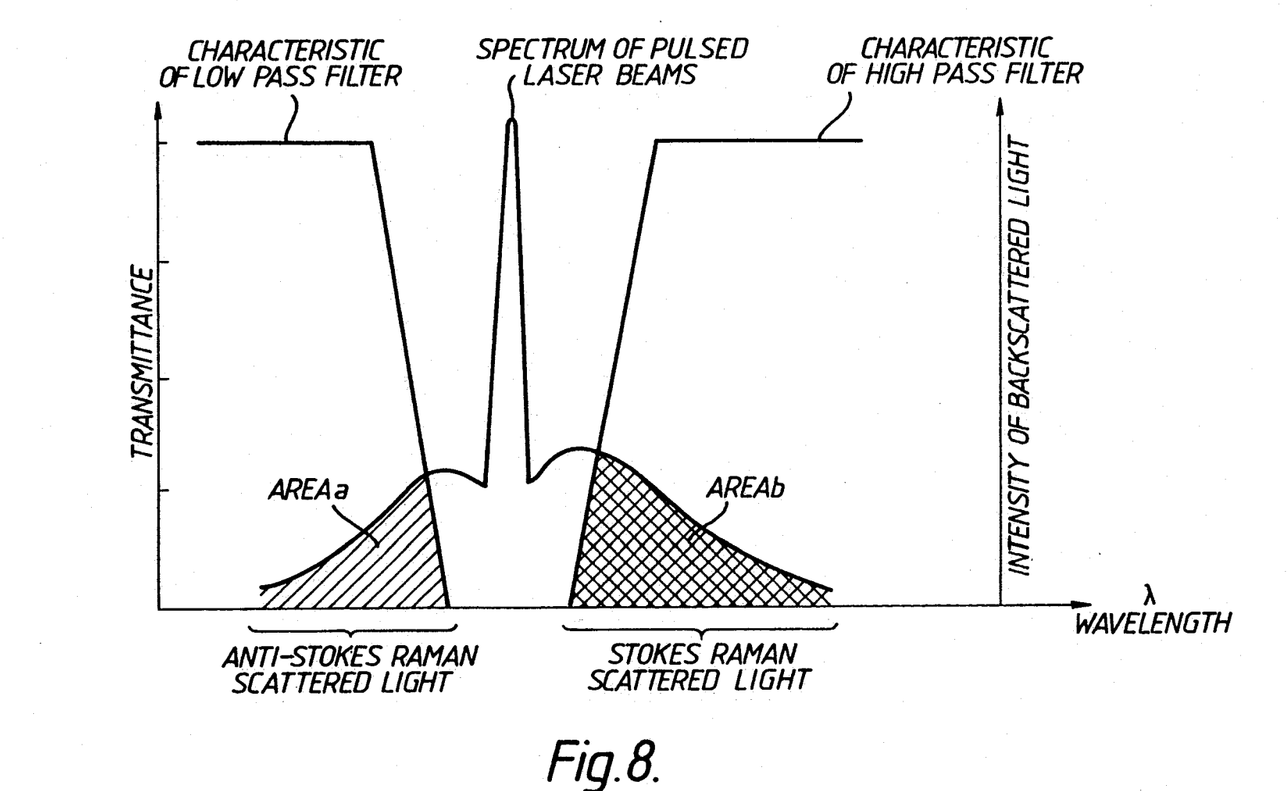
FIG. 8 is a graphical representation showing the relation between a spectrum of the pulsed laser beam output from a laser source, a spectrum of scattered light from the reference temperature portion of the optical fiber and a filter characteristic as used in FIG. 6.

Next, the second embodiment of the invention will be described with reference to FIGS. 6-8.

In the second embodiment of the invention, the Fresnel reflected light is not used as the reference point for detecting a shift in the source frequency. Rather, in the second embodiment, a reference section of the fiber is temperature controlled and any drifting of the source wavelength is monitored and adjusted using a measurement of the backscattered anti-Stokes Raman to the Stokes Raman spectra components. Normally, the ratio of the anti-Stokes Raman to the Stokes Raman backscattering can not be used as a measure of source wavelength variations since the ratio is sensitive to temperature variations, and it is not known whether the source wavelength is changing or the fiber temperature is changing. Thus, maintaining a reference part of the fiber at a controlled, constant temperature permits monitoring of any drifting of the source wavelength.

Figure 6:
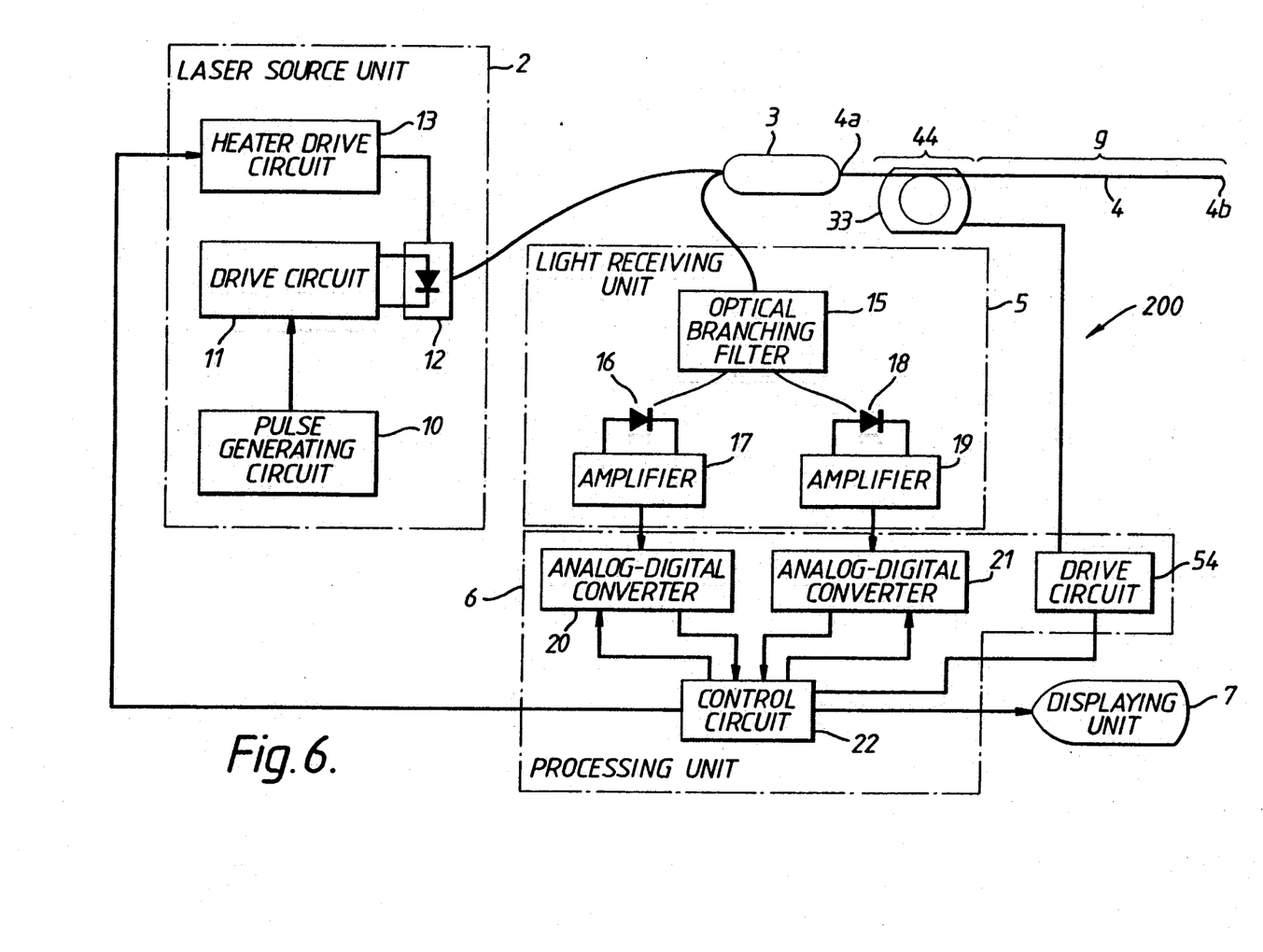
FIG. 6 is a schematic diagram showing a second embodiment of the invention.

The temperature distribution detecting device 200 of FIG. 6 is similar to that of FIG. 1, and corresponding elements are similarly labeled. The description of these elements will be omitted for ease of explanation. Positioned between the I/O end 4a and the measurement part 9 of the fiber 4 is a reference temperature section 44 of the fiber 4. The reference temperature section 44 is controlled to be at one or more reference temperatures by a temperature setting unit 33 which may comprise a heating element or the like either alone or in combination with an enclosure. The temperature setting unit is controlled by a signal from a drive circuit 54 which is part of the processing unit 6. The drive circuit 54 is connected to the control circuit 22 and controlled thereby.

In operation, the control circuit 22 generates a standard temperature signal in response to a set signal from a setting circuit (e.g., a keyboard input device, not shown). The standard temperature signal is fed to the drive circuit 54 which in turn outputs a temperature drive signal to the temperature setting unit 33.

The pulsed laser beam produces backscattered light in the reference temperature section 44. The data corresponding to this backscattered light is stored in the memory of the control circuit 22 along with the data from the measurement section 9. The resulting temperature distribution is illustrated in FIG. 7 where the reference temperature section is maintained, by way of example, at a constant elevated temperature with respect to the measurement section 9. The temperature distribution may be obtained as in FIG. 1 by means of calculating the ratio of the anti-Stokes Raman to Stokes Raman intensities or by means of using only the intensity of the anti-Stokes Raman scattering as is known in the art.

The source wavelength monitoring and correcting are done by controlling the heater drive circuit 13 in a similar manner as in FIG. 1. Now, however, as shown in FIG. 8, the ratio R of the intensity of the anti-Stokes Raman scattered light (area a) to the Stokes Raman scattered light (area b) is examined for that portion of the data corresponding to the reference temperature section 44. This portion of the data may readily be determined by programming the CPU to examine measurement data corresponding to a predetermined distance along the fiber corresponding to the position of the reference temperature section 44. The ratio R changes in response to changes in the wavelength of the laser source for that portion of the data corresponding to the reference temperature section 44. Variations in the value of the ratio from a predetermined value, i.e., one, are used to adjust the laser source wavelength to maintain the source wavelength constant in a manner similar to that shown in FIGS. 4 and 5.

Although the invention is described above with respect to certain preferred embodiments, the scope of the invention is not limited to the specific embodiments described above. For example, the output wavelength of the laser can be varied by varying the current and/or voltage applied to the laser instead of by varying the temperature of the laser. Variations and modifications will be apparent to those skilled in the art after receiving the teachings of the above disclosure. Therefore, the scope of the invention is defined with reference to the following claims.

What is claimed is:

1. In an apparatus for measuring the temperature distribution along an optical fiber using backscattered light, a device for compensating for fluctuations in the wavelength of a laser source of light comprising:
   a. an optical filter receiving light from said fiber, said optical filter having a filter characteristic such as to pass therethrough Fresnel components of light reflected from an end of said optical fiber;
   b. a processing circuit connected to receive signals representative of said Fresnel components, said processing circuit generating an electrical control signal in response to changes in said received signals representative of said Fresnel components; and
   c. means responsive to said control signal, for adjusting the output wavelength of said laser source.

2. A device as recited in claim 1, wherein said processing circuit comprises an electrical data processor, and said device further comprises:
   a. a detector for detecting said Fresnel light components from said optical filter and for generating analog electrical signals corresponding thereto;
   b. an analog-to-digital converter for converting said analog electrical signals to digital electrical signals; and
   c. wherein said digital electrical signals are fed to said electrical data processor as said signals representative of said Fresnel components.

3. A device as recited in claim 2, wherein said means for adjusting the output wavelength of said laser source comprises means for adjusting the temperature of said laser source.

4. A device as recited in claim 3, wherein said means for adjusting the temperature comprises a heater for heating said laser source.

5. A device as recited in claim 1, wherein said means for adjusting the output wavelength of said laser source comprises means for adjusting the temperature of said laser source.

6. A device as recited in claim 5, wherein said means for adjusting the temperature comprises a heater for heating said laser source.

7. A device as recited in claim 2, wherein said optical filter comprises:
   a. a low pass filter, said low pass filter having a high wavelength cut-off characteristic intersecting a low wavelength side of a Fresnel light peak received from reflection from a distal end of said fiber;
   b. a high pass filter, said high pass filter having a low wavelength cut-off characteristic intersecting a high wavelength side of said Fresnel light peak; and
   c. wherein said data processor is responsive to signals from said low and high pass filters as said signals representative of said Fresnel components.

8. A device as recited in claim 7, wherein said data processor calculates the ratio of said signals from said low and high pass filters and generates said control signal in response to changes in the value of said ratio.

9. A device for detecting a temperature distribution comprising:
   a. an optical fiber having a proximal end and a distal end;
   b. a laser light source for generating pulses of laser light;
   c. an optical coupler coupling the pulses of laser light to the proximal end of the optical fiber;
   d. an optical branching filter, said optical branching filter having a filter characteristic passing at least a first portion of the Fresnel reflected light reflected from the distal end of the optical fiber, and also passing at least a second portion of backscattered light resulting from an anti-Stokes Raman interaction of said laser light with said fiber, said second portion being defined as anti-Stokes Raman backscattered light;
   e. said optical coupler coupling light backscattered along said fiber, including said anti-Stokes Raman backscattered light, and propagated to said proximal end of said fiber into said optical branching filter, said optical coupler also coupling said Fresnel reflected light into said optical branching filter;
   f. a detector positioned to receive said first portion of said Fresnel reflected light and said anti-Stokes Raman backscattered light and for generating analog electrical signals corresponding thereto;

g. an analog-to-digital converter connected to receive said analog electrical signals and for generating digital signals corresponding thereto;

h. a digital data processor, connected to receive said digital signals and generating a temperature distribution signal in response to digital signals corresponding to said anti-Stokes Raman backscattered light, and for generating a control signal in response to digital signals corresponding to said first portion of Fresnel reflected light;

i. a display device connected receive said temperature distribution signal to display an indication of the temperature distribution along said optical fiber; and j. means responsive to said control signal, for controlling the output wavelength of said laser light source so as to maintain said output wavelength substantially constant.

10. A device for detecting a temperature distribution using Fresnel reflected light and Raman scattered light comprising:

light generating means for generating an optical signal;

backscattered light generating means for generating backscattered light in response to said optical signal from the light generating means;

separating means for separating said backscattered light from said backscattered light generating means into two channels, a first channel corresponding to anti-Stokes Raman backscattered light and a low wavelength portion of a reflection peak due to Fresnel reflection from an end of said backscattered light generating means, and a second channel corresponding to Stokes Raman backscattered light and a high wavelength portion of said reflection peak due to Fresnel reflection from said end of said backscattered light generating means;

light detecting means for detecting light in said first and second channels and for generating electrical signals in response thereto;

signal producing means, responsive to said electrical signals, for calculating a ratio of anti-Stokes Raman backscattered light to Stokes Raman backscattered light and for producing a temperature distribution signal in response to said ratio;

means, responsive to said temperature distribution signal, for providing an indication of the temperature distribution along said backscattered light generating means;

said signal producing means further responsive to said electrical signals for calculating a ratio of said low wavelength portion to said high wavelength portion of said reflection peak due to Fresnel reflection from said end of said backscattered light generating means and for producing a temperature control signal in response thereto; and temperature control means, responsive to said temperature control signal, for controlling a temperature of said light generating means, said light generating means varying its output wavelength in dependence on its temperature.

11. A device for detecting a temperature distribution as claimed in claim 10, in which said light generating means comprises a laser source unit having a laser source which generates pulsed laser beams.

12. A device for detecting a temperature distribution as claimed in claim 10, in which said backscattered light generating means includes an optical fiber.

13. In an apparatus for measuring the temperature distribution along an optical fiber using backscattered light, a device for compensating for fluctuations in the output wavelength of a laser source of light comprising:

a. a reference temperature section, said reference temperature section being a part of said optical fiber and being controllable to have a fixed temperature;

b. an optical filter receiving said backscattered light at least from said reference temperature section, said optical filter having a filter characteristic such as to pass therethrough anti-Stokes Raman and Stokes Raman backscattered light;

c. a processing circuit connected to receive signals representative of said anti-Stokes Raman and Stokes Raman backscattered light, said processing circuit generating an electrical control signal in response to changes in said received signals representative of said anti-Stokes Raman and Stokes Raman backscattered light; and d. means, responsive to said control signal, for adjusting the output wavelength of said laser source.

14. A device as recited in claim 13, wherein said processing circuit comprises an electrical data processor, and said device further comprises:

a. a detector for detecting said anti-Stokes Raman and Stokes Raman backscattered light from said optical filter and for generating analog electrical signals corresponding thereto;

b. an analog-to-digital converter for converting said analog electrical signals to digital electrical signals; and c. wherein said digital electrical signals are fed to said electrical data processor as said signals representative of said anti-Stokes Raman and Stokes Raman backscattered light.

15. A device as recited in claim 14, wherein said means for adjusting said output wavelength of said laser source comprises means for adjusting the temperature of said laser source.

16. A device as recited in claim 15, wherein said means for adjusting the temperature comprises a heater for heating said laser source.

17. A device as recited in claim 17, wherein said means for adjusting said output wavelength of said laser source comprises means for adjusting the temperature of said laser source.

18. A device as recited in claim 17, wherein said means for adjusting the temperature comprises a heater for heating said laser source.

19. A device as recited in claim 14, wherein said optical filter comprises:

a. a low pass filter, said low pass filter having a high wavelength cut-off characteristic intersecting said anti-Stokes Raman backscattered light;

b. a high pass filter, said high pass filter having a low wavelength cut-off characteristic intersecting said Stokes Raman backscattered light; and c. wherein said data processor is responsive to signals from said low and high pass filters as said signals representative of said anti-Stokes Raman and Stokes Raman backscattered light.

20. A device as recited in claim 19, wherein said data processor calculates the ratio of said signals from said low and high pass filters and generates said control signal in response to changes in the value of said ratio.

21. A device for detecting a temperature distribution comprising:

a. an optical fiber having a proximal end and a distal end, and including a measurement section and a reference temperature section therebetween, said reference temperature section having a controllable temperature;

b. a laser light source for generating pulses of laser light;

c. an optical coupler coupling said pulses of laser light to said proximal end of said optical fiber;

d. an optical branching filter, said optical branching filter having a filter characteristic passing at least portions of backscattered light resulting from anti-Stokes Raman and Stokes Raman interactions of said laser light with said optical fiber, said portions being defined as anti-Stokes Raman backscattered light and Stokes Raman backscattered light;

e. said optical coupler coupling light backscattered along said fiber, including said anti-stokes Raman backscattered light and said Stokes Raman backscattered light, and propagated to said proximal end of said fiber into said optical branching filter;

f. a detector positioned to receive said portions of said anti-Stokes Raman backscattered light and said Stokes Raman backscattered light and for generating analog electrical signals corresponding thereto;

g. an analog-to-digital converter connected to receive said analog electrical signals and for generating digital signals corresponding thereto;

h. a digital data processor, connected to receive said digital signals and generating a temperature distribution signal in response to digital signals corresponding to said anti-Stokes Raman backscattered light and said Stokes Raman backscattered light generated in said measurement section of said optical fiber, and for generating a control signal in response to said digital signals corresponding to said anti-Stokes Raman backscattered light and said Stokes Raman backscattered light generated in said reference temperature section of said optical fiber;

i. a display device connected to receive said temperature distribution signal to display an indication of the temperature distribution along said optical fiber; and j. means, responsive to said control signal, for controlling the output wavelength of said laser light source so as to maintain said output wavelength substantially constant.

22. A device as recited in claim 21, wherein said data processor calculates a ratio of said digital signals and generates said control signal in response to changes in the value of said ratio.

23. A device for detecting a temperature distribution using Raman backscattered light comprising:

light generating means for generating an optical signal;

backscattered light generating means for generating backscattered light in response to said optical signal from said light generating means, said scattered light generating means having a reference temperature portion having a fixed reference temperature;

separating means for separating said backscattered light from said backscattered light generating means into Stokes Raman backscattered light and anti-Stokes Raman backscattered light;

light detecting means for detecting said Stokes Raman backscattered light and said anti-Stokes Raman backscattered light;

signal producing means for calculating a ratio of said anti-Stokes Raman backscattered light to said Stokes Raman backscattered light corresponding t said reference temperature portion of said backscattered light generating means and for producing a temperature control signal in response to this ratio; and said signal producing means calculating a ratio of said anti-Stokes Raman backscattered light to said Stokes Raman backscattered light corresponding to a measurement portion of said backscattered light generating means and for producing a temperature distribution signal in response to this ratio;

means, responsive to said temperature distribution signal, for providing an indication of said temperature distribution along said backscattered light generating means; and temperature control means, responsive to said temperature control signal, for controlling a temperature of said light generating means, said light generating means varying its output wavelength in dependence on its temperature.

24. A device for detecting a temperature distribution as claimed in claim 23, in which said light generating means is a laser source unit having a laser source which generates pulsed laser beams.

25. In a process for measuring the temperature distribution along an optical fiber using backscattered light, a method for compensating for fluctuations in the output wavelength of a laser source of light, comprising the steps of:

a. receiving said backscattered light;

b. filtering said received backscattered light so as to pass therethrough Fresnel components of said received backscattered light;

c. generating an electrical control signal in response to changes in a ratio of said Fresnel components; and d. adjusting said output wavelength of said laser source in response to said control signal.

26. In a process for measuring the temperature distribution along an optical fiber using backscattered light, a method for compensating for fluctuations in the output wavelength of a laser source of light, comprising the steps of:

a. providing a reference temperature section, said reference temperature section being a part of said optical fiber and being controllable to have a fixed temperature;

b. receiving backscattered light at least from said reference temperature section;

c. filtering said received backscattered light so as to pass therethrough anti-Stokes Raman and Stokes Raman backscattered light;

d. generating an electrical control signal in response to changes in a ratio of said anti-Stokes Raman to said Stokes Raman backscattered light; and e. adjusting said output wavelength of said laser source in response to said control signal.

* * * * *